(12) United States Patent
McAuliffe et al.

(10) Patent No.: US 8,419,283 B2
(45) Date of Patent: Apr. 16, 2013

(54) JOURNAL AIR BEARING

(75) Inventors: Christopher McAuliffe, Windsor, CT (US); Ronald M. Struziak, Longmeadow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 420 days.

(21) Appl. No.: 12/845,084

(22) Filed: Jul. 28, 2010

(65) Prior Publication Data

US 2012/0027327 A1    Feb. 2, 2012

(51) Int. Cl.
*F16C 32/06*    (2006.01)

(52) U.S. Cl.
USPC .......................................... 384/103; 384/106

(58) Field of Classification Search .................. 384/103, 384/104, 106
See application file for complete search history.

(56) References Cited

U.S. PATENT DOCUMENTS

| | | | |
|---|---|---|---|
| 3,809,443 A | 5/1974 | Cherubim | |
| 4,415,280 A | 11/1983 | Agrawal | |
| 4,462,618 A | 7/1984 | Stone | |
| 4,701,060 A * | 10/1987 | Gu | 384/106 |
| 4,818,123 A * | 4/1989 | Gu | 384/106 |
| 5,427,455 A * | 6/1995 | Bosley | 384/106 |
| 5,658,079 A | 8/1997 | Struziak et al. | |
| 5,902,049 A * | 5/1999 | Heshmat | 384/106 |
| 5,921,683 A | 7/1999 | Merritt et al. | |
| 6,158,893 A | 12/2000 | Heshmat | |
| 6,964,522 B2 | 11/2005 | Kang et al. | |
| 6,997,613 B2 | 2/2006 | Katou et al. | |
| 7,056,025 B2 | 6/2006 | Nakata | |
| 7,648,279 B2 | 1/2010 | Struziak et al. | |

* cited by examiner

*Primary Examiner* — Phillip A Johnson
(74) *Attorney, Agent, or Firm* — Carlson, Gaskey & Olds PC

(57) ABSTRACT

An example journal air bearing for a rotatable shaft of an air cycle machine includes a top foil configured to receive a rotatable shaft, and an intermediate foil radially outboard the top foil. A journal sleeve is radially outboard the intermediate foil. The top foil and the intermediate foil establish apertures configured to communicate fluid between a first position radially inboard the top foil and a second position radially outboard the intermediate foil.

20 Claims, 3 Drawing Sheets

JOURNAL AIR BEARING

BACKGROUND

This disclosure relates generally to journal air bearings, which are also known as hydrodynamic fluid film journal bearings or foil bearings.

As known, journal air bearings support rotatable components, such as a shaft within an air cycle machine of an aircraft. A typical journal air bearing arrangement includes a top foil, an intermediate foil, and a bump foil. The foils are received within a journal sleeves and wrapped around a rotatable component. The top foil is closer to the rotatable component than the other foils. Journal air bearings use a fluid, such as air, to support the component during rotation. There is little or no contact between the top foil and the rotatable component when the component rotates.

Some journal air bearings include a formed key that extends radially relative to the axis of rotation of the component. The formed key is received within a slot in the journal sleeve. The formed key contacts the edges of the slot to limit rotation of the foils relative to the component. The fluid that supports the component during rotation communicates through the clearance provided at the formed key. The fluid supporting the component is pressurized during rotation. The pressure of the fluid varies depending on the circumferential location relative to the slot. The varied pressures can destabilize the component. In the prior art, pressure of the fluid typically peaks about 180° from the formed key.

SUMMARY

An example journal air bearing for a rotatable shaft of an air cycle machine includes a top foil configured to receive a rotatable shaft, and an intermediate foil radially outboard the top foil. A journal sleeve is radially outboard the intermediate foil. The top foil and the intermediate foil establish apertures configured to communicate fluid between a first position radially inboard the top foil and a second position radially outboard the intermediate foil.

An example journal air bearing foil arrangement includes a top foil having an inner surface configured to face a rotating shaft and an intermediate foil configured to be biased radially inboard toward an outer surface of the top foil. The top foil includes interruptions in the inner surface that are circumferentially spaced from each other. The interruptions are configured to reduce fluid pressure build-up between the top foil and the rotating shaft.

An example method of installing a journal bearing in an air cycle machine includes pressurizing a fluid between a rotating shaft and a foil bearing, relieving the pressure a first location, and relieving the pressure at a second location. The second location is circumferentially spaced from the first location.

These and other features of the disclosed examples can be best understood from the following specification and drawings, the following of which is a brief description.

DETAILED DESCRIPTION

Figure 1:
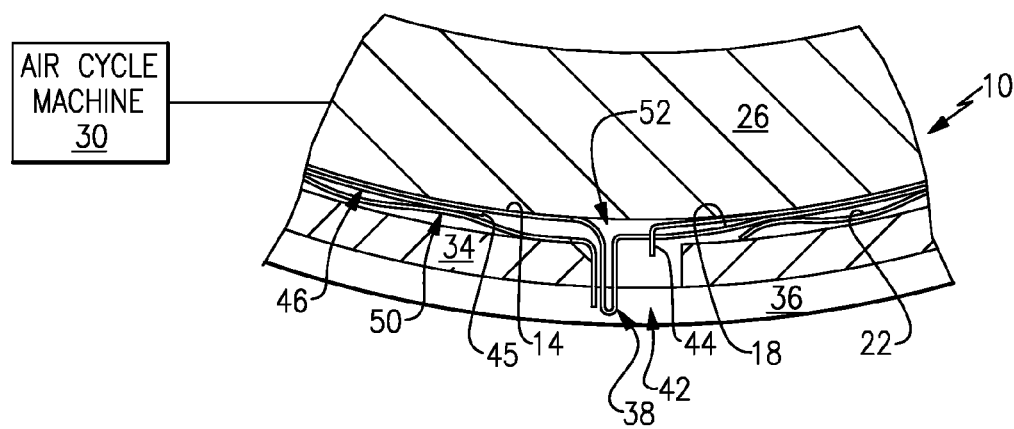
FIG. 1 shows an example journal air bearing arrangement supporting a rotatable shaft of an air cycle machine.
Figure 2:
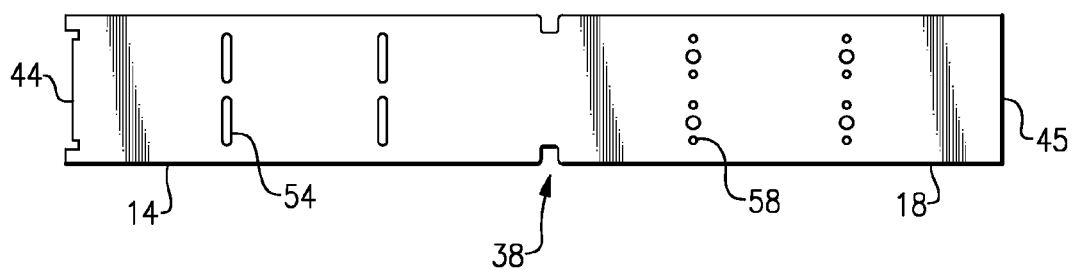
FIG. 2 shows a top foil and an intermediate foil from the journal air bearing arrangement of FIG. 1 in an unwrapped position.
Figure 3:
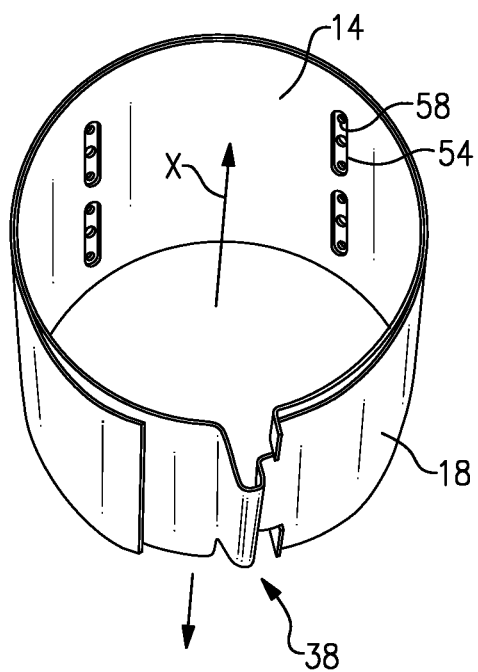
FIG. 3 shows a perspective view of the top foil and the intermediate foil from FIG. 2 in a cylindrical free state position.
Figure 4:
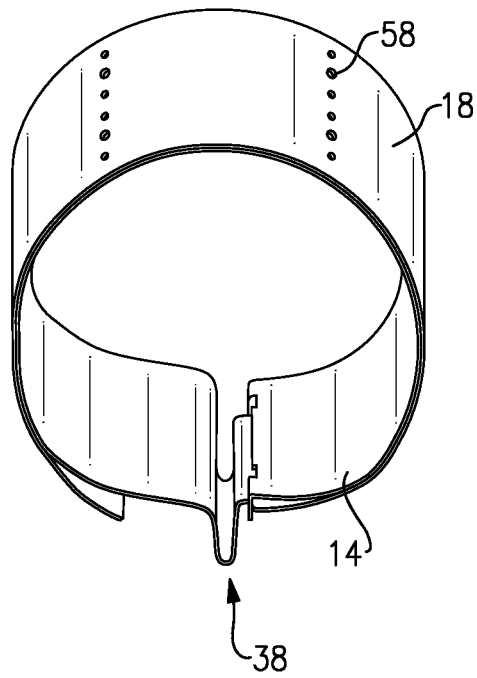
FIG. 4 shows another perspective view of the top foil and the intermediate foil from FIG. 2 in a cylindrical free state position.
Figure 5:
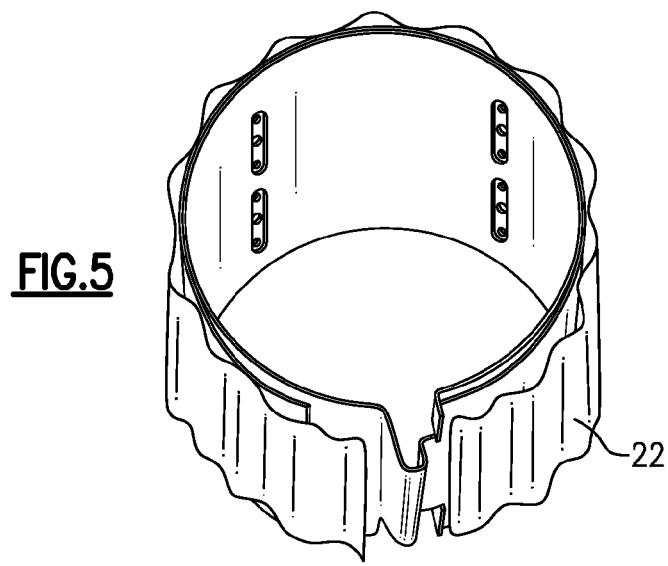
FIG. 5 shows a perspective view of the FIG. 1 journal air bearing arrangement in a cylindrical free state position.

Referring to FIG. 1, an example journal air bearing arrangement 10 includes a top foil 14, an intermediate foil 18, and a bump foil 22. The example journal air bearing arrangement 10 rotatably supports a shaft 26 of an air cycle machine 30 in other examples the journal air bearings are used within other aircraft accessories such as turbo-compressors, cabin air compressors, or ram air fans.

The arrangement 10 and the shaft 26 are received within a journal sleeve 34. A formed key 38 extends radially relative to the shaft 26. The formed key 38 is received within a slot 42 defined within the journal sleeve 34, which is received within a housing bore 36. O-rings are used to retain the journal sleeve 34 within the housing bore 36. When the shaft 26 rotates, the formed key 38 contacts the slot 42, which prevents the bearing arrangement 10 from rotating with the shaft 26.

In this example, the top foil 14 and the intermediate foil 18 are a single piece having a first end portion 44 and a second end portion 45. The formed key 38 joins the top foil 14 and the intermediate foil 18. In another example, the top foil 14 is separate from the intermediate foil 18.

When installed, the top foil 14 and the intermediate foil 18 are each wrapped around the shaft 26. The bump foil 22 is also wrapped about the shaft 26. The bump foil 22 is radially outboard the top foil 14 and the intermediate foil 18. The bump foil 22 biases the intermediate foil 18 toward the top foil 14 to hold the positions of the intermediate foil 18 and the top foil 14 relative to the shaft 26.

In this example, a cooling fluid, such as air, is communicated through channels 46 established between the bump foil 22 and the intermediate foil 18. Cooling fluid also communicates through channels 50 established between the bump foil 22 and the journal sleeve 34. The cooling fluid communicated through the channels 46 and 50 removes thermal energy from the arrangement 10.

Fluid communicates to the area between the top foil 14 and the shaft 26 through a gap 52. The rotation of the shaft 26 causes fluid, such as air, to pressurize in areas between the top foil 14 and the shaft 26. The pressurized fluid urges the top foil 14 radially away from the shaft 26. The shaft 26 then rotates supported by pressurized air between the top foil 14 and the shaft 26. There is little or no contact between the top foil 14 and the shaft 26 when the shaft 26 is rotating at an operational speed. The shaft 26 rotates when the air cycle machine 30 operates.

Referring now to FIG. 2-5 with continuing reference to FIG. 1, a plurality of slots 54 are established within the top foil 14, and a plurality of bores 58 are established within the intermediate foil 18. When the top foil 14 and the intermediate foil 18 are wrapped around the shaft 26, the slots 54 are circumferentially aligned with the bores 58.

The slots 54 and the bores 58 provide a path for communicating fluid from between the top foil 14 and the shaft 26 to the channels 46. Allowing fluid to communicate away from the shaft 26 in this manner relieves some of the pressure between the top foil 14 and the shaft 26.

The communication path provided by the slots 54 and the bores 58 is circumferentially aligned with the channels 46 to facilitate communicating fluid from between the shaft 26 and the top foil 14 to the channels 46.

There are three pressure profiles or pressure drops associated with the example arrangement 10. The formed key 38 establishes one of the pressure profiles. The groups of slots 54 and bores 58 establish the other two pressure profiles.

In this example, one of the groups of slots 54 and bores 58 is circumferentially spaced 120° from the formed key 38 in a clockwise direction. The second one of the groups of slots 54 and bores 58 is circumferentially spaced 120° from the formed key 38 in a counter-clockwise direction. Circumferentially distributing the three pressure profiles balance the forces on the shaft 26 to reducing eccentric displacement of the shaft 26. In other examples, additional groups of slots 54 and bores 58 are used. In such examples, the groups of slots 54 and bores 58 may be circumferentially spaced 90° or 72° from each other.

The plurality of bores 58 includes bores having different diameters. In this example, the diameter of the larger bores is about 0.105 inches (2.67 mm), and the diameter of the smaller bores is about 0.050 inches (1.27 mm). That is, the diameter of the larger bores is about twice the diameter of the smaller bores.

The plurality of slots 54 are each about 0.060 inches (1.52 mm) wide and about 0.410 inches (10.41 mm) long in this example. The plurality of slots 54 are aligned with a rotational axis X of the shaft 26, and are spaced about 0.150 inches (3.81 mm) from an edge of the top foil 14.

In this example, each slot in the plurality of slots 54 is circumferentially aligned with a single larger bore and two smaller bores of the plurality of bores 58. The single larger bore is positioned axially between the two smaller bores. As the diameter of the larger bore is larger than the width of the slot, the larger bore overlaps opposing edges of the slot. The smaller bores do not overlap opposing edges of the slot as the diameter of the smaller bores is less than the width of the slot and the smaller bores are circumferentially centered within the slot.

Figure 6:
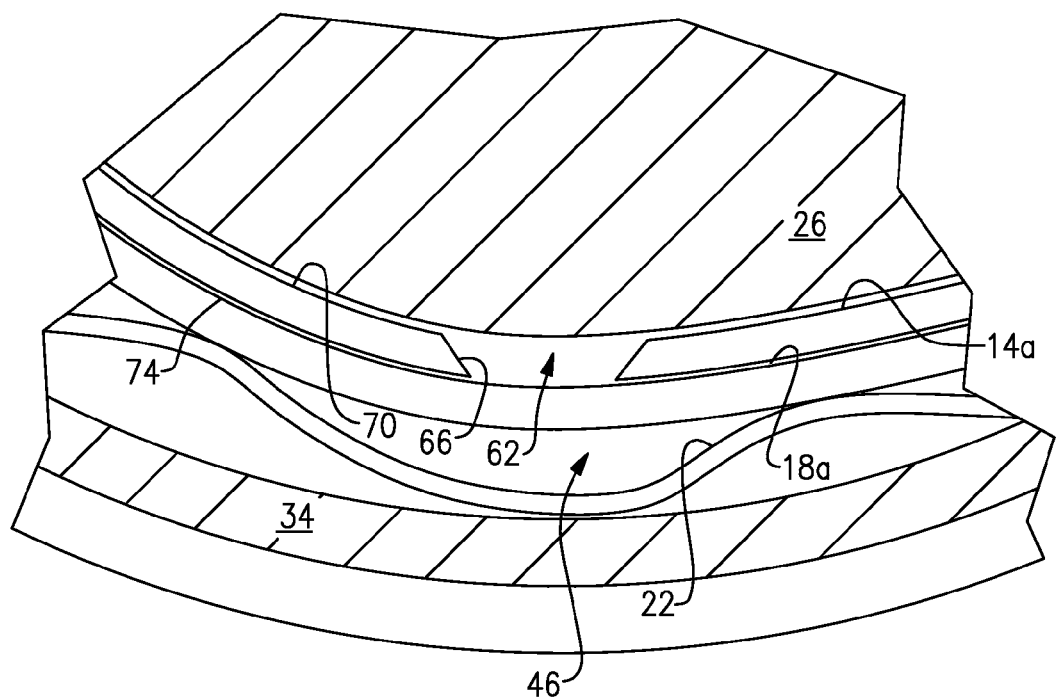
FIG. 6 shows another example journal air bearing arrangement.

Although slots 54 and bores 58 are shown as types of apertures or interruptions, other types of apertures may be utilized to provide the fluid communication path to the channels 46. Further, other examples may include features that do not extend all the way through both the top foil 14 and the intermediate foil 18. For example, referring to FIG. 6, interruptions 62 are provided only in a top foil 14 and an intermediate foil 18a lacks any apertures. The interruptions 62 relieve pressure between the shaft 26 and the top foil 14a, but do not form part of a communication path to the channels 46. The interruptions 62 provide a pressure drop and turbulate flow of fluid between the shaft 26 and the top foil 14a.

The example interruptions 62 are three times wider than the slots 54 (FIGS. 1-5) to provide sufficient pressure relief. Other examples include interruptions 62 having different widths, such as interruptions that are two times wider than the slots 54. The interruptions 62 typically need to be wider than the slots 54 to provide sufficient pressure relief in the absence of apertures in the intermediate foil 18a.

In this example, radially extending edges 66 of the top foil 14a define the interruptions 62. The edges 66 are radiused to control flow of fluid into the interruptions 62.

The example interruptions 62 extend from an inner surface 70 of the top foil 14a to an outer surface 74. In other example, the interruptions 62 do not extend through the entire top foil 14a.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A journal air bearing for a rotatable shaft of an air cycle machine, comprising:
   a top foil configured to receive a rotatable shaft;
   an intermediate foil radially outboard the top foil; and
   a journal sleeve radially outboard the intermediate foil, wherein the top foil and the intermediate foil establish apertures configured to communicate fluid between a first position radially inboard the top foil and a second position radially outboard the intermediate foil.

2. The journal air bearing of claim 1, including a bump foil radially inboard the journal sleeve and adapted to bias at least a portion of the top foil against an outer surface of the rotating shaft.

3. The journal air bearing of claim 2, wherein the apertures are configured to communicate fluid to a cavity established between the bump foil and the intermediate foil, the cavity configured to communicate cooling air in a direction aligned with an axis of rotation of the rotating shaft.

4. The journal air bearing of claim 1, wherein the apertures are circumferentially spaced from a formed key that joins the top foil to the intermediate foil, the formed key extending radially and configured to prevent rotation of the top foil relative to the rotating shaft.

5. The journal air bearing of claim 1, wherein the rotatable shaft is disposed within an aircraft air cycle machine.

6. The journal air bearing of claim 1, wherein the top foil is joined to the intermediate foil.

7. The journal air bearing of claim 1, wherein the apertures include a first slot in the top foil circumferentially aligned with at least one bore in the intermediate foil, and a second slot in the top foil circumferentially aligned with at least one bore in the intermediate foil.

8. A journal air bearing foil arrangement, comprising:
   a top foil having an inner surface configured to face a rotating shaft; and
   an intermediate foil configured to be biased radially inboard toward an outer surface of the top foil, wherein the top foil includes a plurality of interruptions in the inner surface that are circumferentially spaced from each other and are configured to reduce fluid pressure build-up between the top foil and the rotating shaft.

9. The journal air bearing foil arrangement of claim 8, including a formed key connecting the top foil to the intermediate foil, the formed key configured to limit rotation of the journal air bearing foil relative to the rotating shaft.

10. The journal air bearing foil arrangement of claim 9, wherein the at least one interruption is circumferentially spaced from the formed key.

11. The journal air bearing foil arrangement of claim 9, wherein the at least one interruption comprises a first aperture arrangement circumferentially spaced 120° from the formed key and a second aperture arrangement circumferentially spaced 120° degrees from the first aperture arrangement.

12. The journal air bearing foil arrangement of claim 8, wherein the plurality of interruptions comprises at least one slot aligned with a rotational axis of the rotating shaft.

13. The journal air bearing assembly of claim 8, wherein the journal air bearing assembly is a fluid film journal air bearing.

14. The journal air bearing foil arrangement of claim 8, wherein the plurality of interruptions form portions of at least one fluid communication path extending from inner surface to the outer surface.

15. The journal air bearing foil arrangement of claim 14, wherein the at least one fluid communication path includes at least one slot in the top foil that is aligned with a rotational axis of the rotating shaft, and at least one bore in the intermediate foil.

16. The journal air bearing foil arrangement of claim 15, wherein the at least one bore includes a first group of bores and a second group of bores, the first group of bores and the second group of bores each including at least one first bore and a plurality of second bores, the at least one first bore having a greater diameter than the each of the plurality of second bores.

17. The journal air bearing foil arrangement of claim 16, wherein diameter of the at least one first bore is greater than the width of the slot and the diameter of each of the plurality of second bores is less than the width of the slot.

18. The journal air bearing foil arrangement of claim 16, wherein the first group of bores and the second group of bores each include one first bore positioned axially between two second bores.

19. A method of installing a journal air bearing in an air cycle machine, comprising:
 receiving a top foil of the journal air bearing in a rotatable shaft of the air cycle machine, the top foil including apertures;
 arranging an intermediate foil radially outboard the top foil, the intermediate foil including apertures;
 wrapping a bump foil radially outboard the top foil and the intermediate foil to form channels between the bump foil and the intermediate foil; and
 establishing a path to communicate fluid between the rotatable shaft and the channels through the apertures of the top foil and the apertures of the intermediate foil.

20. The method of claim 19 further comprising:
 joining the top foil to the intermediate foil with a formed key extending radially and configured to prevent rotation of the top foil relative to the rotating shaft; and
 using the formed key to circumferentially align the apertures of the top foil with the apertures of the intermediate foil.

* * * * *